(12) United States Patent
Stephens et al.

(10) Patent No.: US 10,710,510 B2
(45) Date of Patent: Jul. 14, 2020

(54) SEAT ATTACHMENT (71) Applicant: Tedder Industries, LLC, Post Falls, ID (US)

(72) Inventors: Drew Stephens, Coeur d'Alene, ID (US); Jacob Shearer, Post Falls, ID (US)

(*) Notice: Subject to any disclaimer, the term of this patent is extended or adjusted under 35 U.S.C. 154(b) by 0 days.

(21) Appl. No.: 16/386,174

(22) Filed: Apr. 16, 2019

(65) Prior Publication Data
US 2019/0322221 A1 Oct. 24, 2019

Related U.S. Application Data (60) Provisional application No. 62/661,713, filed on Apr. 24, 2018.

(51) Int. Cl.
*B60R 7/14* (2006.01)
*B60R 7/04* (2006.01)
*F41C 33/04* (2006.01)
*F41C 33/02* (2006.01)

(52) U.S. Cl.
CPC .............. *B60R 7/14* (2013.01); *B60R 7/043* (2013.01); *F41C 33/0263* (2013.01); *F41C 33/04* (2013.01); *F41C 33/045* (2013.01)

(58) Field of Classification Search
CPC ... B60R 7/14; B60R 7/043; B60R 2011/0012; B60R 2011/0017; B60R 2011/0059; F41C 33/041; F41C 33/045
USPC .......................................... 224/275, 572, 661
See application file for complete search history.

(56) References Cited

U.S. PATENT DOCUMENTS

| | | | | |
|---|---|---|---|---|
| 3,295,887 A | * | 1/1967 | Bacon | B60N 2/6027 297/188.2 |
| 3,942,691 A | * | 3/1976 | Sisak | B60R 7/14 224/275 |
| 5,503,316 A | * | 4/1996 | Stewart | B60R 7/05 224/312 |
| 5,833,102 A | * | 11/1998 | Jacobson | B60R 7/14 224/275 |
| 6,003,746 A | * | 12/1999 | Richardson | A01K 97/10 224/162 |
| 6,149,042 A | * | 11/2000 | Rassias | A45F 5/00 224/661 |
| 6,279,799 B1 | * | 8/2001 | Horton | B60R 7/14 211/64 |
| 6,293,447 B1 | * | 9/2001 | Jorgensen | B60R 7/14 211/64 |
| 6,755,331 B2 | * | 6/2004 | Rassias | F41C 33/0227 224/193 |
| 7,950,554 B2 | * | 5/2011 | Hoffner | A45F 5/02 224/222 |

(Continued)

*Primary Examiner* — Justin M Larson
(74) *Attorney, Agent, or Firm* — Timberline Patent Law Group (57) ABSTRACT

Representative implementations of devices and techniques provide a seat attachment assembly to receive and to support an implement (such as a handgun, for example) or an implement holster (such as a handgun holster, for example), in a variety of configurations. The seat attachment assembly includes a planar seat attachment unit arranged to be mounted in various locations using one or more straps threaded through a portion of the seat attachment unit, for temporarily and safely stowing the implement, while making the implement easily accessible to the user.

20 Claims, 7 Drawing Sheets

(56) References Cited

U.S. PATENT DOCUMENTS

| | | | | |
|---|---|---|---|---|
| 8,196,792 | B2* | 6/2012 | Clifton, Jr. | A45F 5/00 |
| | | | | 224/661 |
| 9,027,811 | B1* | 5/2015 | Cannon | F41C 33/041 |
| | | | | 224/192 |
| D734,706 | S * | 7/2015 | Gleaton | B60R 7/06 |
| | | | | D12/415 |
| 9,227,573 | B2* | 1/2016 | Hudspeth | B60R 7/14 |
| 9,340,164 | B2* | 5/2016 | Pickett | B60R 7/14 |
| 9,598,021 | B2* | 3/2017 | Noonan | F41C 33/041 |
| 9,968,073 | B1* | 5/2018 | Leung | A01K 27/002 |
| 10,145,650 | B1* | 12/2018 | Terhark | B60R 7/14 |
| 10,274,284 | B2* | 4/2019 | Tedder | F41C 33/041 |
| 10,295,305 | B2* | 5/2019 | Tedder | F41C 33/0263 |
| 10,495,411 | B1* | 12/2019 | Tedder | F41C 33/045 |
| 2006/0081669 | A1* | 4/2006 | Rissler | B60R 11/0258 |
| | | | | 224/275 |
| 2006/0138187 | A1* | 6/2006 | Love | B60R 13/00 |
| | | | | 224/572 |
| 2010/0176167 | A1* | 7/2010 | Hudspeth | F41C 33/06 |
| | | | | 224/275 |
| 2014/0166712 | A1* | 6/2014 | Pickett | B60R 7/14 |
| | | | | 224/483 |
| 2014/0183234 | A1* | 7/2014 | Hudspeth | B60R 7/14 |
| | | | | 224/275 |
| 2015/0233669 | A1* | 8/2015 | Ponder | F41C 33/001 |
| | | | | 224/271 |
| 2018/0118124 | A1* | 5/2018 | Leverett | B60R 7/14 |
| 2018/0195834 | A1* | 7/2018 | Tedder | F41C 33/045 |
| 2019/0322221 | A1* | 10/2019 | Stephens | F41A 23/26 |

* cited by examiner

SEAT ATTACHMENT

PRIORITY CLAIM AND CROSS-REFERENCE TO RELATED APPLICATION

This application claims the benefit under 35 U.S.C. § 119(e)(1) of U.S. Provisional Application No. 62/661,713, filed Apr. 24, 2018, which is hereby incorporated by reference in its entirety.

BACKGROUND

Implements, such as tools, weapons, and the like, may be temporarily encased in a carrier (such as a holster, for instance) for protection of the implement and/or the user, while providing access to the implement. For example, a carrier may allow a user to conveniently carry the implement, safely retaining the implement until needed. When the implement is to be used, the user may withdraw the implement from the carrier, and then return it to the carrier when finished. In some cases, such as with a handgun for example, the holster may allow the user to conceal the implement, or to conceal the fact that the user is carrying the implement.

In the case of a handgun, the holster should reasonably protect the handgun and the user, and should be convenient to the user for ready use. However, the holster should also be versatile enough to be comfortably carried by the user, such as when it is worn on the person of the user for an extended length of time. The holster should also be rigid and stable enough to allow the handgun to be repeatedly drawn and re-holstered, usually with the same hand.

Holster mounting accessories are often used to mount a holster to an article of furniture, or the like, for easy access by the user. A holster mounting accessory should reliably retain the holster, supporting the weight of the holster and the implement within. The mounting accessory should allow the user to draw the handgun for use without undue effort or difficulty, and to replace the handgun in the holster easily. The mounting accessory should retain the holster during the drawing and reholstering, and any other activity that may put a strain on the holster, mounting accessory, or the items that the mounting accessory is attached to. Further, in some cases, mounting accessories may also be arranged to be easily installed and removed, while remaining capable of retaining the holster securely while in use.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

DETAILED DESCRIPTION

Overview

Representative implementations of devices and techniques provide a seat attachment assembly to receive and to support an implement (such as a handgun, for example) or an implement holster (such as a handgun holster, for example), in a variety of configurations. The seat attachment assembly is arranged to be mounted in various locations for temporarily and safely stowing the implement, while making the implement easily accessible to the user.

For example, the seat attachment assembly may be mounted to a user's seat, such as a car seat within a vehicle, for example, a desk chair, or the like. In other applications, the seat attachment assembly may be mounted to a portion of a desk, nightstand, or other furniture, on a bedframe, on a portion of a wall, or the like, either within view or concealed from view. The seat attachment assembly may be removed from one location and mounted to another location (e.g., moved from one vehicle to another vehicle) if desired, or multiple seat attachment assemblies may be used in various locations by a user.

In various implementations, the user can remove the implement or implement holster from their person, and mount the implement or implement holster to the seat attachment assembly for temporary storage with easy access. For example, when preparing to use a vehicle, the user may remove a holster from a location on the user's person, and mount the holster to the seat attachment assembly located inside the vehicle (for example, on the user's car seat). Accordingly, the seat attachment assembly may include modular components, featured components, or other components that make transfer of the implement or the implement holster quick and easy, as well as secure.

In various embodiments, as shown in FIGS. 1-16, a seat attachment assembly 100 comprises a two piece or three (or more) piece strap mount assembly. Hard components of the seat attachment assembly 100 may be coupled to a strap 104 (or the like) to firmly secure the seat attachment assembly 100 to the desired item. A holster 202 or other item can be temporarily or permanently coupled to one or more of the seat attachment assembly 100 components. The seat attachment assembly 100 can be moved by releasing the tension (loosening the coupling fasteners 106 or straps 104) between the components, moving the seat attachment assembly 100 to a new location, and tightening the fasteners 106 to secure the seat attachment assembly 100 in the new location.

Figure 2:
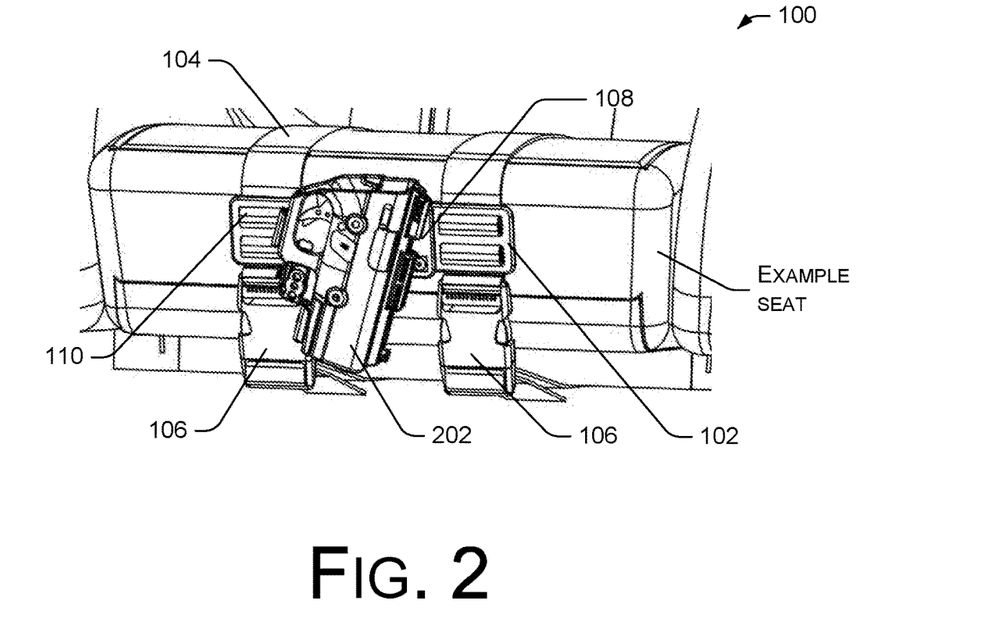
FIG. 2 shows a front view of an example seat attachment assembly, coupled to an example seat, with a holster mounted to the assembly, according to an embodiment.
Figure 3:
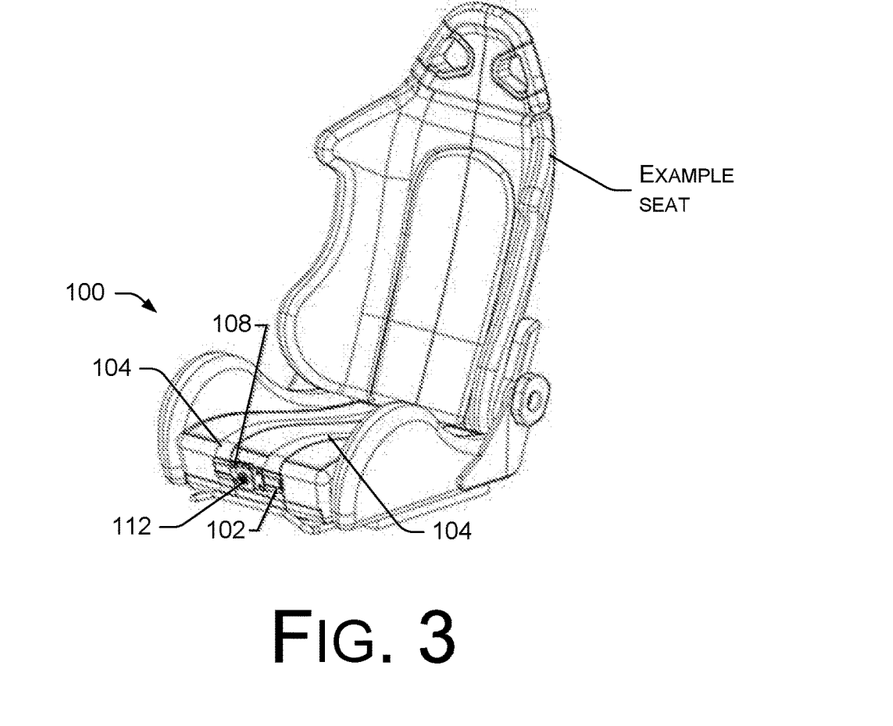
FIG. 3 shows a front perspective view of an example seat attachment assembly without a holster mounted to the attachment assembly, coupled to an example seat, according to an implementation.
Figure 4:
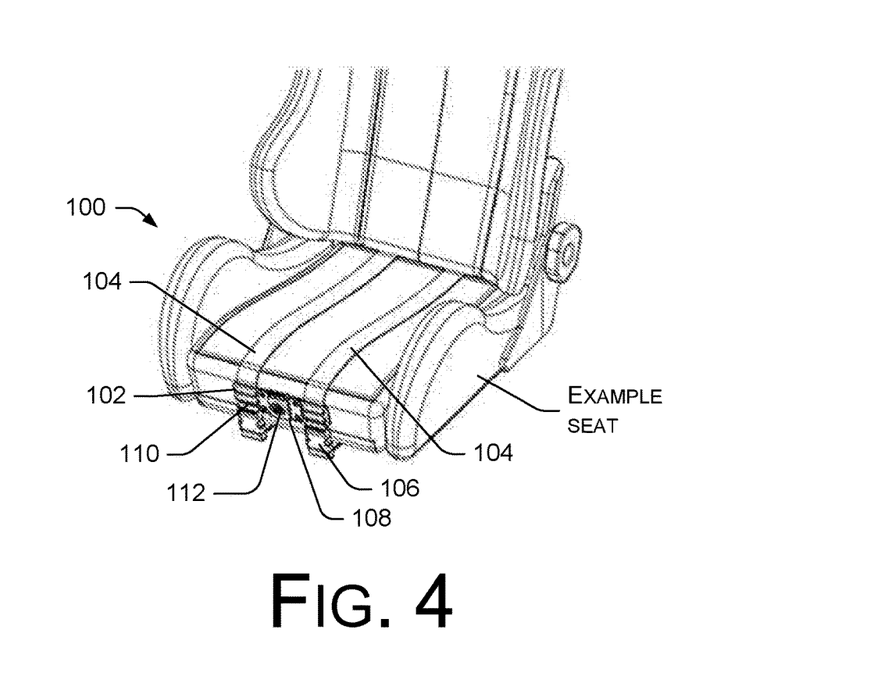
FIG. 4 shows another front perspective view of the example seat attachment assembly of FIG. 3, without a holster mounted to the attachment assembly, according to an implementation.
Figure 5:
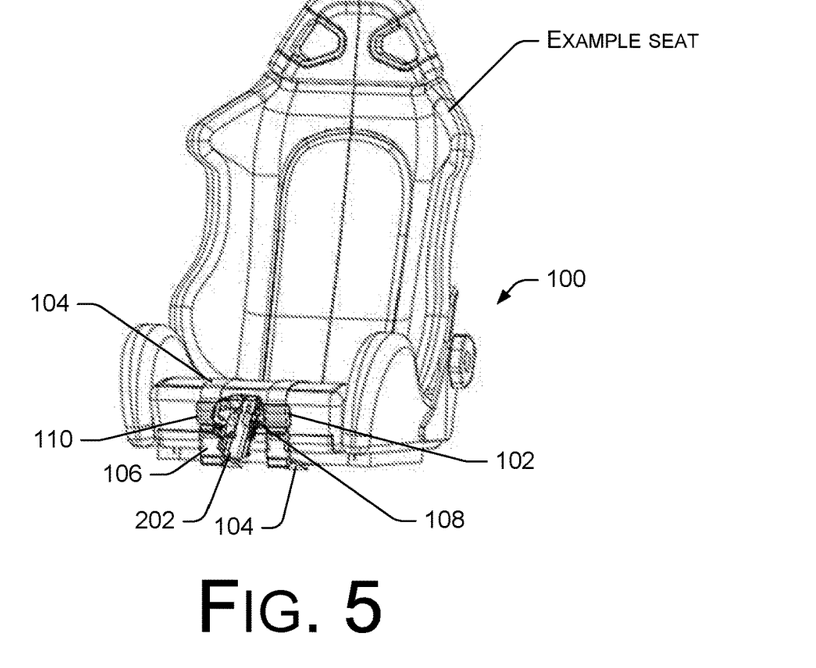
FIG. 5 shows a front perspective view of the example seat attachment assembly of FIG. 3, with a holster mounted to the attachment assembly, according to an implementation.
Figure 6:
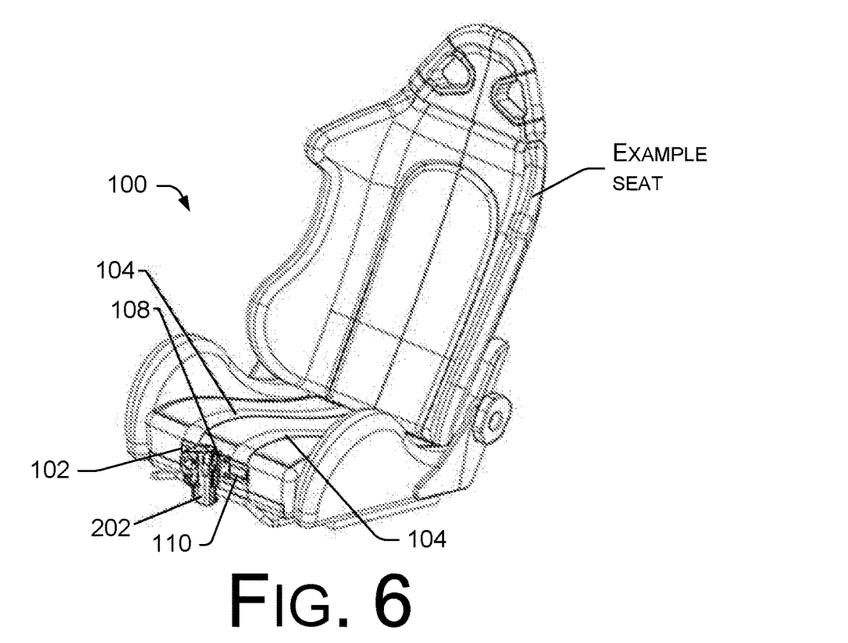
FIG. 6 shows a front perspective view of an example seat attachment assembly, with a holster mounted to the attachment assembly, according to another implementation.

As shown in FIGS. 2, 5, and 6, the seat attachment assembly 100 may be used with an inside the waistband (IWB) holster, an outside the waistband (OWB) holster, or other holster (such as a holster shell, for instance) for a handgun, or the like. The illustrations are not intended to be limiting however, and the seat attachment assembly 100 may be used with various other types of holsters, as well as with other implements, tools, weapons, and the like, and their respective cases, carriers, holsters, sheaths, and so forth. For this disclosure, the use of the term "holster" 202 applies to any of these, and also applies to various implements, tools, weapons, and the like, without a holster.

Techniques and devices are discussed with reference to example handgun holsters. However, this is not intended to be limiting, and is for ease of discussion and illustrative convenience. The techniques and devices discussed may be applied to a holster or to any of various cases, carriers, containers, implements, tools, objects, and the like, and remain within the scope of the disclosure.

Further, the shape and quantity of the seat attachment assembly components illustrated in the figures may vary to accommodate various applications. In alternate embodiments, fewer, additional, or alternate components may be used and/or combined to form a seat attachment assembly having an equivalent function and operation.

Implementations are explained in more detail below using a plurality of examples. Although various implementations and examples are discussed here and below, further implementations and examples may be possible by combining the features and elements of individual implementations and examples.

Example Embodiments

An example seat attachment assembly 100, as shown in FIGS. 1-8, includes one or more seat attachment units 102, which may be mounted individually or in groups to the seat (or other item) as desired. An example seat attachment assembly 100 can also include one or more straps 104 for coupling a seat attachment unit 102 to the seat, one or more fasteners 106 for adjusting the straps 104 and securing the straps 104 to the seat, and may include one or more strap attachments (back stops) 802 (see FIGS. 8, 15, and 16) for fixing and holding the strap 104 in a desired position or configuration on the seat.

As shown in FIGS. 1-6, in various embodiments, a seat attachment assembly 100 may include other components as desired. For example, in one embodiment, the seat attachment assembly 100 may include a holster mount 108 integral to or mounted to the seat attachment unit 102 and configured to receive a holster, a holster shell, an implement, or the like.

In other embodiments, the seat attachment assembly 100 may also include an integrated holster 202 or holster shell (or the like).

As shown in FIGS. 1-8, the seat attachment assembly 100 may be coupled to a vehicle on the user's seat in a convenient location (such as on the front surface of the seat cushion, side of the cushion, or the like), within easy reach of the user while in the vehicle. Alternately, the seat attachment assembly 100 may be fastened around a seat back, console, or other item in the user's vehicle or elsewhere. The user can easily and quickly dismount the implement or implement holster from the seat attachment assembly and place it on their person when desired (such as when leaving the vehicle), using like featured components on the seat attachment assembly 100 and the user's wearable holster support. Alternately, the user can withdraw the implement from the holster 202 for use while the holster 202 remains mounted to the seat attachment assembly 100. The implement may be returned to the holster 202 while the holster 202 is mounted to the seat attachment assembly (as shown at FIG. 2).

In various alternate examples, the seat attachment assembly 100 can be mounted to the user's personal gear for carrying the implement externally or in a concealed manner. For example, the seat attachment assembly 100 can be fitted around a personal accessory, such as a backpack, range bag, tactical bag, hunting gear, or the like, locking in position onto the personal item and providing an accessible mount for the implement or implement holster. The seat attachment assembly 100 can also be used to support an implement or implement holster in another location, convenient to a user.

In an embodiment, one or more straps 104 couple the seat attachment unit(s) 102 to the seat, or the like. The straps 104 may comprise strips of durable textile material, similar to vehicle seat belts. Alternately, the straps 104 may comprise a polymer, a natural or synthetic leather, an aramid, or combinations of materials providing durability and comfort.

As shown in FIGS. 1-6, the straps 104 are threaded through strap openings (e.g., strap slots 110) of the seat attachment unit 102 to mount the seat attachment unit 102 to the vehicle seat (or other object). For instance, the straps 104 may be wrapped around the seat cushion (or other object) with the seat attachment unit 102 positioned in a desired location and orientation for ease of use. In an alternate embodiment, a portion of one or more of the straps 104 may be wrapped around a portion of the seat attachment unit(s) 102 as well.

Figure 7:
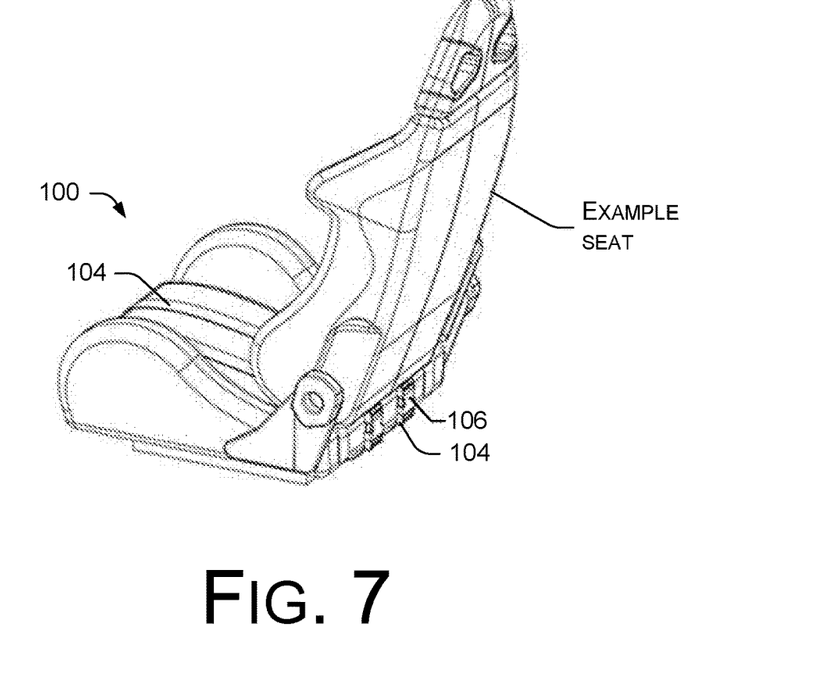
FIG. 7 shows a side/back view of an example seat attachment assembly, coupled to an example seat, according to an implementation.

The straps 104 may be wrapped around the seat cushion as shown in FIGS. 1-8, (or otherwise), and fastened together with one or more fasteners 106. Various configurations are possible for arranging the straps 104 around the seat cushion, as shown in the drawings at FIGS. 1-8 (other configurations can also be used). For instance, the straps 104 can be arranged with the fasteners 106 at the front of the seat (as shown at FIGS. 1, 2, 4, 5, and 8) or with the fasteners 106 at the rear of the seat (as shown at FIG. 7), or at any location desired for convenience and security.

Fasteners 106 may include clips, connectors, snaps, couplers, and the like, arranged for securely connecting ends of the straps 104 together and for holding the straps 104 to the seat (or other object). Each of the straps 104 may include one or more fasteners 106, with a fastener 106 (or a fastener portion) coupled to an end of each of the straps 104. Accordingly, the straps 104 may comprise multiple strap-sections, which may be coupled together with fasteners 106.

The straps 104 and/or the fasteners 106 may include adjusters (not shown) to cinch the straps 104 taut around the seat cushion for a secure fit. For instance, the straps 104 may be threaded through openings of the fasteners 106 to couple the straps 104 to the fasteners 106, and may be adjusted via the threading.

Figure 8:
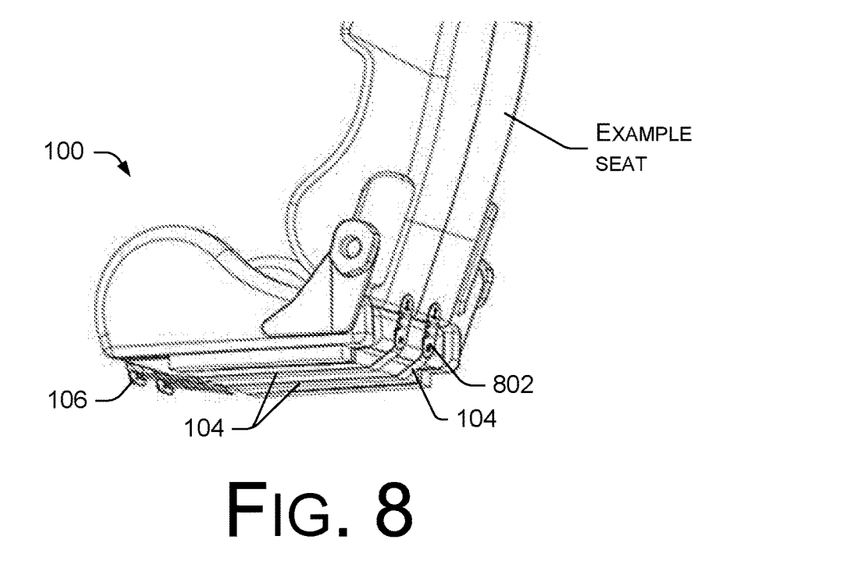
FIG. 8 shows a side/back view of an example seat attachment assembly, coupled to an example seat, according to another implementation.
Figure 9:
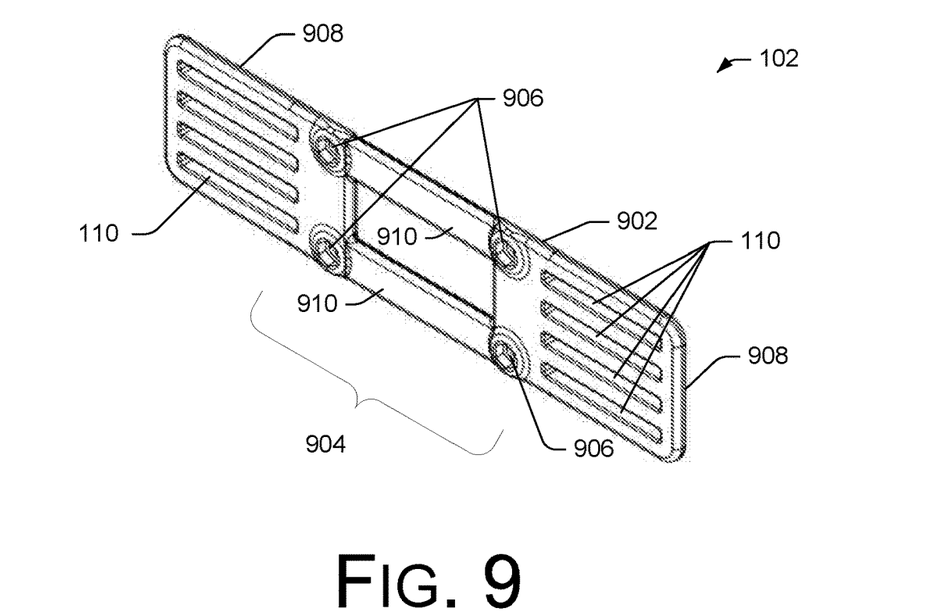
FIGS. 9-11 include three views (perspective, top, and front, respectively) of an example seat attachment, according to an embodiment.

As shown in FIG. 8, the straps 104 may also be coupled to one or more strap attachments or back stops 802 to help maintain a desired positioning of the straps 104 relative to the seat cushion. For instance, a back stop 802 can be coupled to a strap 104 at a desired location along a length of the strap 104. The back stop 802 can act as a stop against the strap 104 moving by positioning the back stop 802 behind the seat at a point where the seat cushion meets the seat back, for instance (with the strap 104 between the seat cushion and the seat back). This can help prevent the straps 104 from migrating around the seat cushion, and thus help to maintain the desired position of the seat attachment unit 102 on the seat (or other object). In alternate embodiments, the back stops 802 may be positioned at other locations as desired to help prevent the straps 104 from migrating.

Referring to FIGS. 1-6, if included, a holster mount 108 may be integral to or coupled to the seat attachment unit 102. The holster mount 108 may be a docking unit of various configurations arranged to receive a holster 202 or implement by engaging with the holster or implement, and securing the holster or implement to the seat attachment unit 102 until intentionally released by the user.

Figure 1:
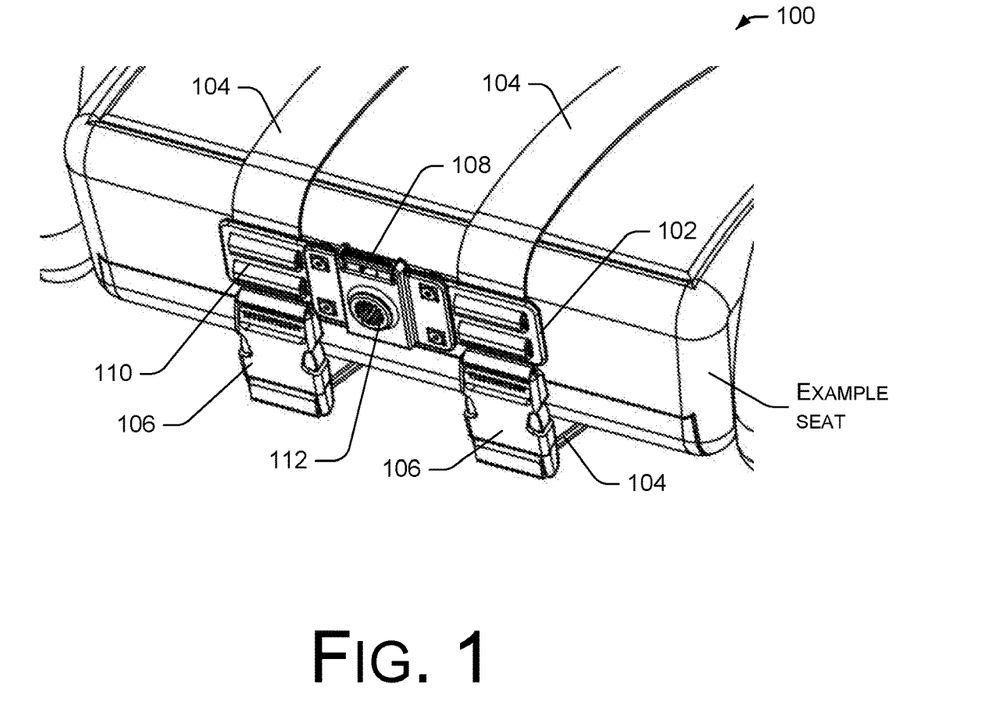
FIG. 1 shows a front perspective view of an example seat attachment assembly, coupled to an example seat, without a holster mounted to the assembly, according to an embodiment.

In an implementation, as shown at FIG. 1, the holster mount 108 may include a receiver portion 112, where a portion of the holster 202 or implement can be inserted into to secure the holster 202 or implement to the holster mount 108. The receiver portion 112 may include one or more features (e.g., splines, a characteristic shape, tabs, etc.) to orient the holster 202 or implement as desired, while the holster 202 or implement is mounted to the holster mount 108. This allows the user to determine a desired orientation (e.g., mounting angle, etc.) for the holster 202 or implement for ease of access, as well as security.

For instance, the holster 202 may include a male post portion (not shown) that is inserted into the receiver 112 to mount the holster 202 to the holster mount 108 in one of multiple user-selected rotational orientations. The receiver 112 and the post may have matching size, shape, features, and so forth, so that the receiver 112 will receive the post in a secure manner. For instance, a preselected quantity of input splines arranged around an outer perimeter of the post can match up to the same preselected quantity and complementary shape of receiving splines arranged around an inner perimeter of the opening of the receiver 112 for a secure fit. The input splines mesh with the receiving splines as the post is inserted into the receiver 112.

In an alternate implementation, the quantity of input splines may be less than the quantity of receiving splines, but each of the input splines still meshes with a receiving spline to secure the holster 202 to the receiver 112. In various implementations, the shape and profile of the input splines and the receiving splines may vary (e.g., rounded, curved, sharp, polygonal, keyway shaped, irregularly shaped, shallow, moderately deep, deep, etc.), with the input splines arranged to mesh with the receiving splines to removably couple the post to the holster mount 108.

The spline attachment nature of the receiver 112 allows a user to position the implement or holster (e.g., carrier) at various angles between 0 and 360 degrees, by positioning the post of the holster 202 into the receiver 112 at the desired rotational angle (i.e., cant) with respect to the holster mount 108. For example, depending on the quantity of input splines and receiving splines, a number of discrete angular positions (e.g., discrete rotational angular increments) are possible between the post and the holster mount 108. A user can adjust the rotational orientation of the post with respect to the holster mount 108 at any time by unlocking the post, removing the post from the receiver 112, and reinserting the post into the receiver 112 at a new desired angle.

Further, the holster mount 108 may include one or more locking mechanisms to secure the holster 202 or implement to the holster mount 108 until intentionally released, such as the splined locking mechanism described in United States Patent Application Publication No. US 2018/0195834 A1, which is incorporated herein in its entirety. The locking mechanisms may be activated automatically when the holster 202 or implement is inserted into the receiver 112, and may be released by a tab, button, lever, or the like, to allow the user to remove the holster 202 or implement from the holster mount 108.

For instance, in an embodiment, the locking mechanisms are integral to or coupled to the button, which may be spring-loaded or otherwise biased (using one or more springs, for example). Locking features move out of the way when the post is inserted into the receiver 112 while the locking mechanism is in a locked configuration, and move back into place (protruding into the receiver 112 opening) when encountering a groove of the post. The reduced diameter of the post at the groove can allow the button to return to the rest position (e.g., the extended position), closing on the groove, which automatically traps the post in the receiver 112.

In an embodiment, the button also includes matching splined features, which are arranged to line up with the receiving splines when the locking features are opened, that is, moved out of the way by the post, as the post enters the receiver 112 or when the locking features are moved out of the way as the button is retracted into the holster mount 108. For example, depressing the button aligns the splined features to the receiving splines so that the post can be removed from the receiver 112 (to remove or reposition the post, for example).

Referring to FIGS. 2, 5, and 6, a holster 202, holster shell, or the like, may be coupled to the holster mount 108 (e.g., via the receiver 112) to receive and support an implement. In various implementations, the holster 202 (or the like) is removably coupled to the holster mount 108, and may be removed to be worn on the user when desired. In some implementations, holsters 202 are interchangeable, allowing one holster 202 to be removed from the holster mount 108 and another holster 202 to be coupled to the holster mount 108 in its place, for supporting a different implement, for instance. Thus, the seat attachment assembly 100 may include a set of interchangeable holsters 202 of different sizes, shapes, and so forth, configured to be alternately coupled to the holster mount 108 as desired. Alternately, the holster 202, holster shell, or the like may be integral to the seat attachment unit 102 and/or the holster mount 108 (if present), or permanently coupled to the seat attachment unit 102 and/or the holster mount 108.

FIGS. 9-11 and 12-14 show two example embodiments of a seat attachment unit 102, in various views. In other embodiments, an example seat attachment unit 102 may have fewer, additional, or alternate features. Further, in various embodiments, the seat attachment unit 102 may have a different shape or configuration to accommodate (e.g., fit, etc.) a particular application or a number of applications.

As shown in FIGS. 9-11 and 12-14, a seat attachment unit 102 can include a substantially planar hard mount component (or body) 902 configured to receive and to support an implement or an implement holster, a mounting portion 904 which includes one or more mounting holes 906 (holster mount attachment holes 906, for instance) and one or more strap mounts 908 including one or more strap openings (e.g., strap slots) 110, each. In various implementations, the seat attachment unit 102 may include additional components.

In an implementation, the seat attachment unit 102 has at least one substantially planar surface 912 for mating against a desired mounting surface (such as a seat cushion, etc.). Additionally, the planar surface 912 may be used to receive and to support a paddle holster (or the like) onto the seat attachment unit 102 for securing the holster to the seat attachment unit 102. For instance, the size and shape of the body 902 and/or the mounting portion 904 of the seat attachment unit 102 may be selected to snugly fit the paddle of a particular paddle holster, slide or loop of a slide-on holster, or generally fit various paddle holsters or slide-on holsters. For example, the body 902 and/or the mounting portion 904 may comprise a plate, or have a generally polygonal (e.g., rectangular, etc.) portion or overall shape with a thin cross-section (for instance having the general cross-sectional dimensions of a belt, or the like) to fit the paddle or slide/loop of a holster.

In some embodiments, as shown in FIGS. 9-14, the mounting portion 904 comprises two or more parallel, coplanar, rigid plates or polygonal sections 910. For instance, a mounting portion 904 comprising multiple thinner plates 910 can accommodate smaller paddles, slides, loops, or the like, making the mounting portion 904 accommodating to a greater variety of implements, holsters and/or holster couplers. Sufficient space is given between the multiple thinner plates 910 for attaching and removing the implements, holsters and/or holster couplers.

The body 902 and/or the mounting portion 904 may be mostly or completely rigid, or include some portions that are semi-flexible, while being robust enough to support the weight of a holster and implement. For instance, as described below, the body 902 and/or the mounting portion 904 may be comprised of various polymers, metals, composites, or the like, or combinations thereof.

As shown in FIGS. 9-14, the mounting portion 904 includes one or more mounting holes 906 for attaching a holster mount 108 (or a holster, an implement, etc.) to the seat attachment unit 102. The holster mount 108 may be mounted to the mounting portion 904 using fasteners (such as screws or bolts, for example) through the mounting holes 906 in the mounting portion 904.

In some embodiments, the mounting holes 906 are disposed at a perimeter of the mounting portion 904, for example, at the ends of the multiple two or more rigid plates 910 of the mounting portion 904, or the like. In other embodiments, the mounting holes 906 are arranged at other locations of the mounting portion 904. Alternately, the mounting holes 906 may be arranged at the strap mounts 908 or at other locations on the body 902. In some cases, the mounting holes 906 may be threaded, or include features arranged to mate with particular fasteners, particular holster mounts 108, or the like.

In some implementations, the holster mount 108 is integral to the body 902 of the seat attachment unit 102. In other implementations, the holster mount 108 is removably coupled to the body 902 via one or more of the mounting holes 906, other removable fasteners, or various removable techniques. For instance, the holster mount 108 may be slideably coupled to the body 902, may slide over the body 902, may be rotatably coupled to the body 902, may clip onto the body 902, and so forth.

In an embodiment, the seat attachment unit 102 includes one or more rigid planar strap mounts 908 configured for coupling the seat attachment unit 102 to the seat (or other object) via the straps 104. The strap mounts 908 may be disposed on either side of the mounting portion 904, coplanar to the mounting portion 904, as shown in FIGS. 9-14. Alternately, the strap mounts 908 may be disposed above and below the mounting portion 904, or otherwise integral to or coupled to the mounting portion 904. In various embodiments, the strap mounts 908 each include one or more slots 110 to couple the straps 104 to the strap mounts 908. For instance, the straps 104 may be threaded through the strap slots 110 at one or more of the strap mounts 908.

Figure 12:
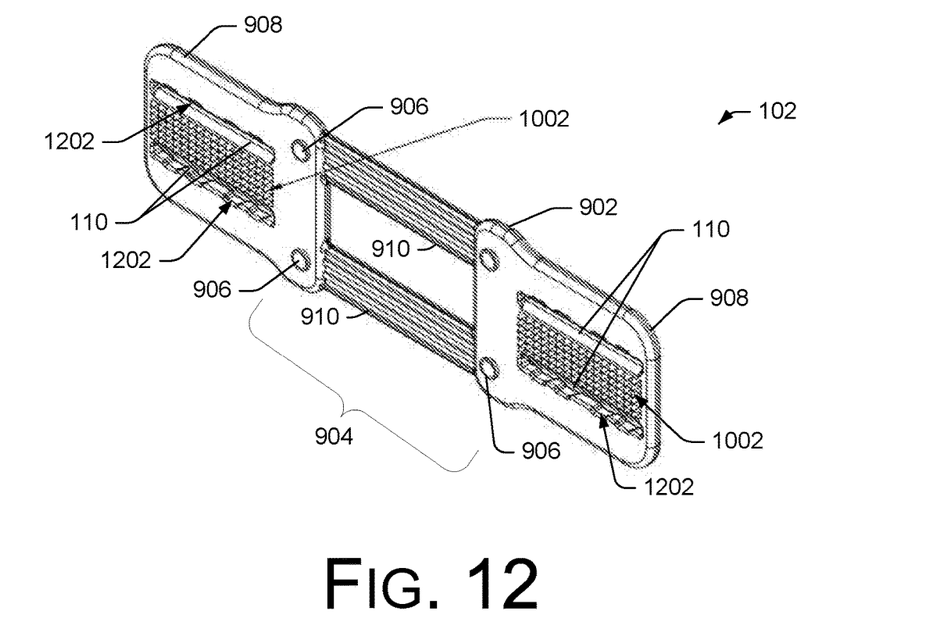
FIGS. 12-14 include three views (perspective, top, and front, respectively) of an example seat attachment, according to another embodiment.
Figure 13:
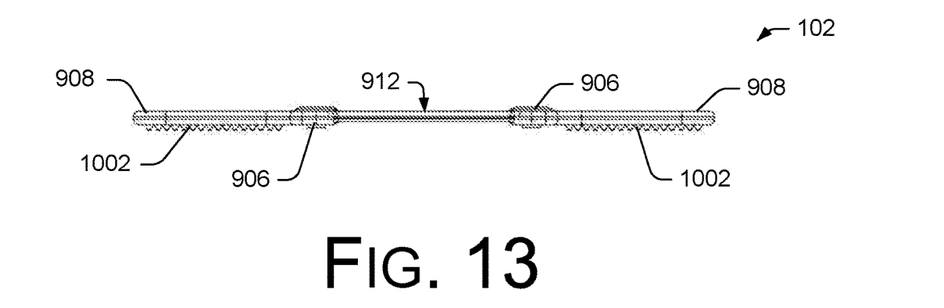
Figure 14:
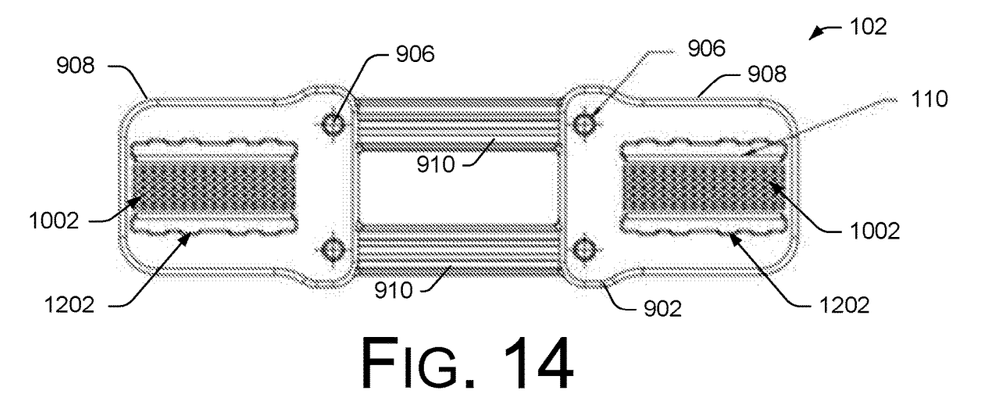

In some embodiments, as shown in FIGS. 12 and 14, one or more of the strap slots 110 may include featured openings 1202, configured to reduce movement of the straps 104 through the slots 110, to help the straps 104 to maintain their position relative to the seat attachment unit 102, once put in place. For instance, the featured openings 1202 may include uneven openings of the slots 110, including textures, ridges, recesses, a repeating or random pattern, or the like, on the openings of the slots 110. In some cases, the uneven features of the featured openings 1202 may be present around the entire openings of the slots 110, and in other cases, the uneven features may be present only at a portion of the openings of the slots 110.

When the straps 104 are threaded through the slots 110 and/or pulled tight around the seat (or other object), this can pull the straps 104 against the featured openings 1202, providing some resistance against the straps 104 moving within the slots 110. This can help the seat attachment unit 102 to retain its position relative to the straps 104 and relative to the seat (or other object).

In an embodiment, the seat attachment unit 102 may also include one or more strap grip portions 1002, as shown in the examples of FIGS. 10 and 12-14. The strap grip portions 1002 may include one or more different arrangements and configurations of features, configured to increase the friction of the surface of the body 902 to the straps 104 and/or to the seat cushion (or other object). The shape and orientation of the features of the strap grip portions 1002 are configured to help the seat attachment unit 102 grip the straps 104 and/or the seat cushion, to maintain the position of the seat attachment unit 102 relative to the straps 104 and/or the seat cushion, once positioned by the user.

For instance the strap grip portion 1002 can include various textures, grids, patterns, protrusions, cavities, ridges, depressions, and the like, extending from or into and arranged on the surface of the body 902, and having various shapes (e.g., pointed, polygonal, irregular, etc.) with various sizes, combinations, spacing, and at various angles to grip the straps 104 and/or the seat cushion. The strap grip portions 1002 may be molded into the seat attachment unit 102, or they may be added or fixed (using fasteners, adhesives, or the like) to the seat attachment unit 102. In an implementation, the strap grip portion 1002 on a surface of the body 902 changes (i.e., increases) a coefficient of friction of the surface of the body 902, based on the physical characteristics of the strap grip portion 1002. The strap grip portion 1002 may be comprised of the same material or a different material as the body 902.

In various implementations, protrusions or textures of the strap grip portion 1002 may have various shapes (e.g., pointed, rounded, blunted, rectangular, etc.), sizes, layout, arrangement, spacing, and quantities, and may be oriented at various angles with respect to the surface of the body 902 to achieve desired friction results. In other words, orienting includes that the features of the strap grip portion 1002 may also extend from the surface of the body 902 at an angle, in addition to or alternate to perpendicular to the surface of the body 902.

Figure 10:
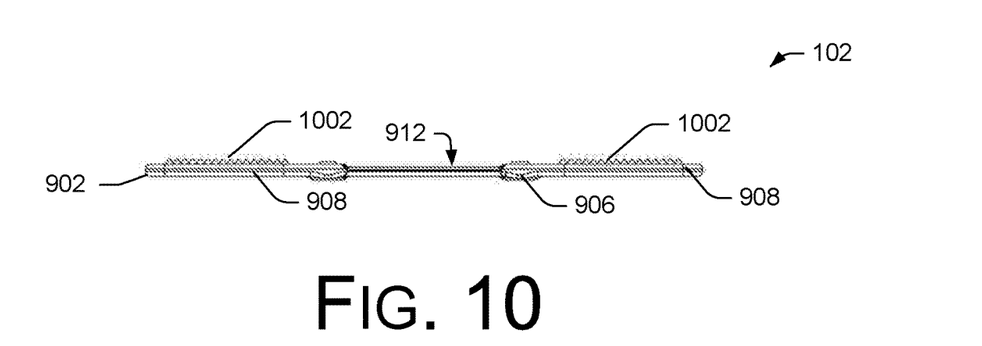
Figure 11:
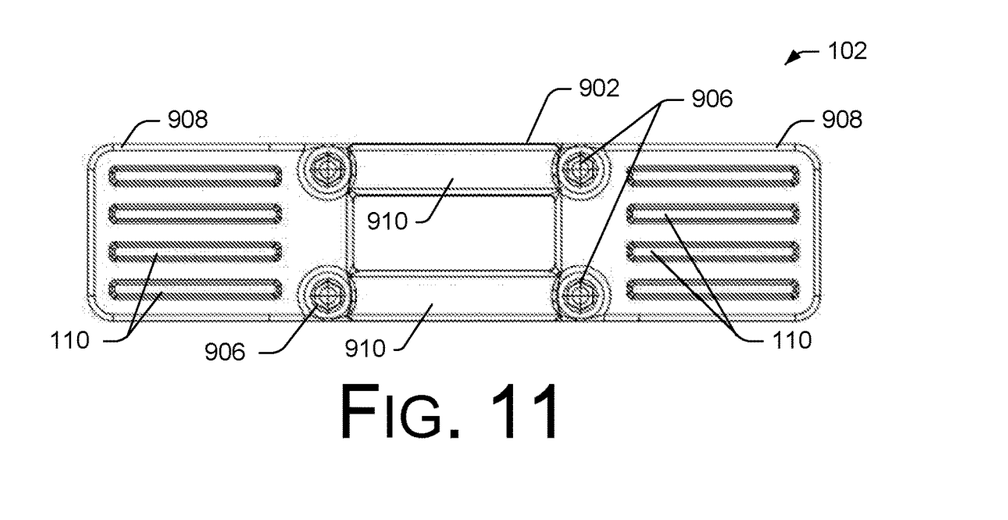

In an embodiment, the strap grip portion(s) 1002 can be disposed on the front and/or back side of the body 902, or on the surface of the body 902 intended to be facing the seat or other object when the seat attachment unit 102 is coupled to the desired object. In one implementation, the strap grip portions 1002 are disposed at least partly around the perimeter of one or more of the strap slots 110, as shown in FIG. 10. In another implementation, the strap grip portions 1002 are disposed between slots 110, as shown at FIGS. 12 and 14. The strap grip portions 1002 may also cover a substantial portion of one or more surfaces of the body 902.

Figure 15:
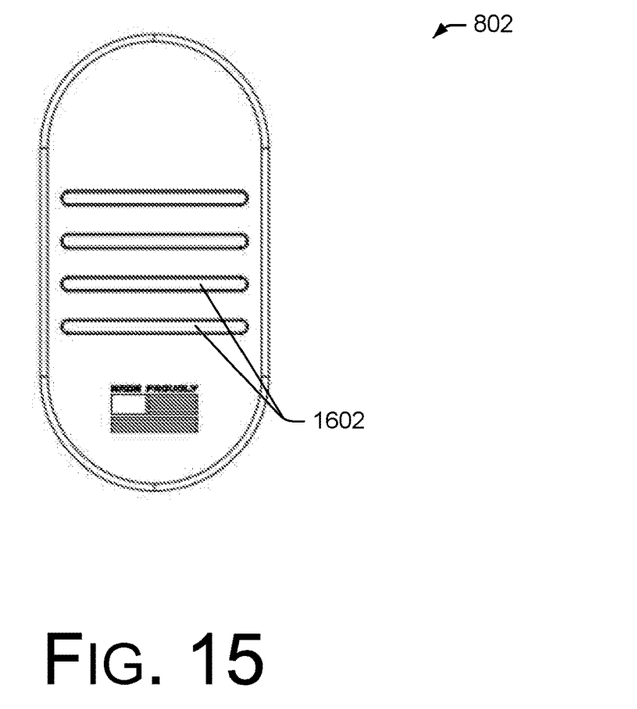
FIGS. 15 and 16 include two views (front and perspective, respectively) of an example strap attachment, according to an embodiment.
Figure 16:
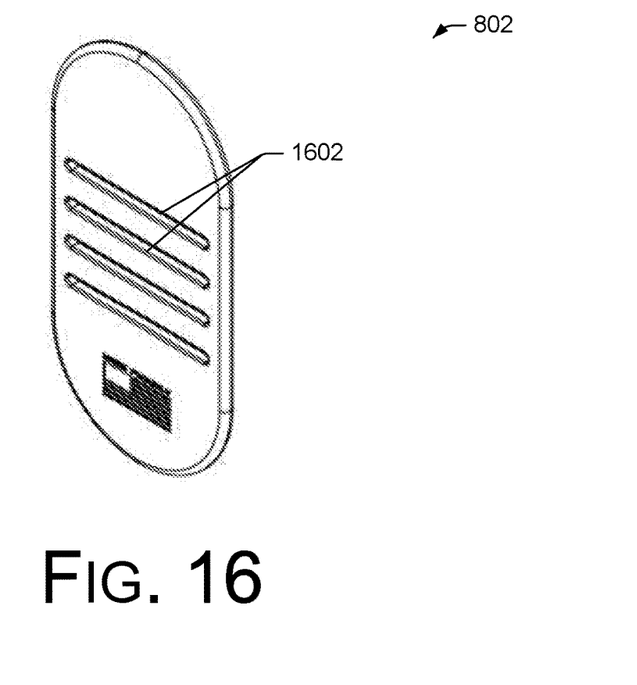

Referring to FIGS. 15 and 16, an example back stop 802 is shown according to an embodiment. The back stop 802 may comprise a rigid planar component with one or more strap slots 1602. The rigid component of the back stop 802 may be large enough to overlap the gap between the seat cushion and the seat back, as shown in FIG. 8, for instance. This prevents the back stop 802 from being pulled through the gap between the seat cushion and the seat back, keeping the strap 104 in place on the seat.

In an embodiment, a strap 104 may be coupled to a back stop 802 by threading the strap 104 through one or more of the strap slots 1602. In various embodiments, the strap slots 1602 may have a smooth opening, or a textured opening to grip the strap 104 threaded through the slots 1602.

In various implementations, components of the seat attachment assembly 100, including the seat attachment unit(s) 102, the holster mount 108, the holster 202, the back stops 802 and fasteners 106 are comprised of various plastics, composites, metals, combinations of the same, or the like. For example, the seat attachment assembly 100 components may be comprised of a polyamide, or similar material. In one example, the seat attachment assembly 100 components may be injection molded, stamped, formed, or the like. In various embodiments, the seat attachment assembly 100 components have rigidity and stability properties based on a particular material selected for the seat attachment assembly 100 components. For example, some materials that may be used include styrenic block copolymers (TPE-s), polyolefin blends (TPE-o), elastomeric alloys (TPE-v or TPV), thermoplastic polyurethanes (TPU), Thermoplastic copolyesters, thermoplastic polyamides, various metals and alloys, fiber composites, combinations of the same, and the like. Additionally, in some embodiments, the stability properties are also based on a thickness of the seat attachment assembly 100 components.

The illustrations of FIGS. 1-16 are not intended to be limiting. In the various example embodiments illustrated in FIGS. 1-16, the location and position of the components, mechanisms, and the like, are for example only. Other locations and positions are contemplated and are within the scope of this disclosure. In various implementations, the seat attachment assembly 100 components may have different shapes or sizes than those illustrated, and remain within the scope of the disclosure. In some cases, additional or alternative components, techniques, sequences, or processes may be used to implement the techniques described herein. Further, the components and/or techniques may be arranged and/or combined in various combinations, while resulting in similar or approximately identical results.

It is to be understood that a mount assembly 100 may be implemented as a stand-alone device or as part of another system (e.g., integrated with other components, or the like). In various implementations, additional or alternative components may be used to accomplish the disclosed techniques and arrangements. Although various implementations and examples are discussed herein, further implementations and examples may be possible by combining the features and elements of individual implementations and examples.

In various embodiments, the seat attachment assembly 100 may be added to an existing arrangement (such as holsters and holster mounting apparatus and assemblies, or vehicles, for example). For instance, the existing arrangements may be retrofitted with the seat attachment assembly 100 or with seat attachment assembly 100 components. In other embodiments, the seat attachment assembly 100 may be a part of a new arrangement, such as a new holster rig, case, enclosure, vehicle, or the like.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing the claims.

What is claimed is:

1. A seat-mounted holster assembly, comprising:
   a seat attachment unit, comprising a planar rectangular body component configured to conform to a surface of a seat cushion and to support a handgun, the seat attachment unit including:
     a mounting portion including at least two parallel, coplanar, rigid rectangular plates;
     a plurality of mounting holes, a mounting hole disposed at each end of the at least two rigid rectangular plates;
     two rigid planar strap mounts disposed on either side of the mounting portion, a first strap mount coupled to or integral to a first edge of the at least two rigid rectangular plates and a second strap mount coupled to or integral to a second edge of the at least two rigid rectangular plates, coplanar to the at least two rigid rectangular plates;
     a plurality of parallel strap slots through each of the strap mounts, the strap slots having featured uneven openings; and
     at least one strap grip portion at a surface of each of the strap mounts, having an arrangement of features configured to increase a friction at the surface of each of the strap mounts;
   one or more mounting straps threaded through the plurality of strap slots at each of the strap mounts and arranged to couple the seat attachment unit to the seat cushion, the one or more mounting straps configured to wrap around the seat cushion;
   a plurality of fasteners, a fastener coupled to each end of the one or more mounting straps and arranged to couple a first end of a strap to a second end of the strap, while the strap is threaded through the plurality of strap slots to secure the straps to the seat cushion;
   a holster mount coupled to or integral to the mounting portion, the holster mount comprising a planar portion and including a circular splined receiver and a locking mechanism; and
   a handgun holster removably coupled to the holster mount via a portion of the holster interfaced with the splined receiver and locked to the splined receiver via the locking mechanism, the holster configured to receive and to support the handgun.

2. The seat-mounted holster assembly of claim 1, further comprising a rigid planar back stop moveably coupled to each of the mounting straps, the mounting straps threaded through a set of parallel slots in the back stop, the back stop configured to be trapped behind the seat cushion and a seat back with the mounting straps between the seat cushion and the seat back.

3. The seat-mounted holster assembly of claim 1, wherein a rotational angle of the holster is adjustable to various angles from 0 to 360 degrees relative to the holster mount while coupled to the holster mount, due to splined features of the splined receiver.

4. The seat-mounted holster assembly of claim 1, wherein locking features of the locking mechanism are biased, the locking features configured to move when the portion of the holster is inserted into the splined receiver and to move again to lock the portion of the holster in the receiver when the portion of the holster is fully inserted.

5. The seat-mounted holster assembly of claim 4, wherein the locking features include matching splined features to splined features of the receiver, arranged to align with the splined features of the receiver when the locking mechanism is opened.

6. The seat-mounted holster assembly of claim 1, wherein the at least one strap grip portion comprises an arrangement of pointed protrusions disposed around a perimeter of one or more of the strap slots.

7. The seat-mounted holster assembly of claim 1, wherein the locking mechanism includes a spring-loaded button configured to release the holster from the holster mount, allowing the holster to be removed from the holster mount when the button is activated.

8. A holster mounting assembly, comprising:
an attachment unit, comprising a planar rectangular body component configured to support an implement, the attachment unit including:
a rigid planar mounting portion including at least one rigid rectangular plate;
a plurality of mounting holes, a mounting hole disposed at a periphery of the mounting portion;
two rigid planar strap mounts disposed on either side of the mounting portion, coupled to or integral to opposite edges of the mounting portion, coplanar to the mounting portion;
a plurality of parallel strap slots through each of the strap mounts; and
at least one strap grip portion at a surface of each of the strap mounts, having an arrangement of features configured to increase a friction at the surface of each of the strap mounts;
one or more mounting straps threaded through the plurality of strap slots at each of the strap mounts and arranged to couple the attachment unit to an object, the one or more mounting straps configured to wrap around the object;
a plurality of fasteners, a fastener coupled to each end of the one or more mounting straps and arranged to couple a first end of a strap to a second end of the strap, while the strap is threaded through the plurality of strap slots to secure the straps to the object; and
a holster mount coupled to or integral to the mounting portion, the holster mount comprising a planar portion and including a receiver configured to receive a portion of an implement holster and a locking mechanism configured to trap a portion of the implement holster.

9. The holster mounting assembly of claim 8, further comprising a handgun holster removably coupled to the holster mount via a portion of the holster interfaced with the receiver and locked to the receiver via the locking mechanism, the holster configured to receive and to support an implement.

10. The holster mounting assembly of claim 8, further comprising a set of interchangeable holsters of different sizes or shapes configured to be alternately coupled to the holster mount.

11. The holster mounting assembly of claim 8, wherein the strap slots include featured uneven openings with ridges around the openings of the strap slots.

12. The holster mounting assembly of claim 8, wherein the at least one strap grip portion is disposed between strap slots of the plurality of parallel strap slots.

13. A holster mounting assembly, comprising:
an attachment unit, comprising a planar body component configured to receive and to support an implement or an implement holster, the attachment unit including:
a rigid planar mounting portion configured for mounting the implement or the implement holster;
one or more mounting holes disposed at a periphery of the mounting portion;
one or more rigid planar strap mounts coupled to or integral to the mounting portion, coplanar to the mounting portion; and
a plurality of strap openings through the one or more strap mounts;
one or more mounting straps threaded through the plurality of strap openings and arranged to couple the attachment unit to a desired object, the one or more mounting straps configured to wrap around a portion of the object; and
a plurality of fasteners, a fastener coupled to each end of the one or more mounting straps and arranged to couple a first end of a strap to a second end of the strap, while the strap is threaded through the plurality of strap openings to secure the straps to the portion of the object.

14. The mounting assembly of claim 13, the attachment unit further comprising a strap grip portion having one or more features configured to increase a friction of a surface of the attachment unit to the one or more mounting straps or to the desired surface, the strap grip portion arranged to maintain a position of the one or more mounting straps relative to the attachment unit and/or to maintain a position of the attachment unit to the desired surface.

15. The mounting assembly of claim 13, further comprising one or more back stops having a plurality of strap slots, the one or more back stops arranged to prevent movement of the one or more mounting straps relative to the desired surface, the one or more mounting straps threaded through the plurality of strap slots.

16. The mounting assembly of claim 13, further comprising a holster mount mounted to the mounting portion via the one or more mounting holes and configured to receive a holster or implement for removably securing the holster or implement to the attachment unit.

17. The mounting assembly of claim 16, wherein the holster mount includes a receiver having one or more features configured to orient the holster or implement at a desired rotational angle while a portion of the holster or implement is engaged with the receiver.

18. The mounting assembly of claim 16, wherein the holster mount includes a receiver having a locking mechanism configured to lock the holster or implement to the holster mount until intentionally released by a user.

19. The mounting assembly of claim 13, further comprising a holster or holster shell removably coupled to the attachment unit and configured to receive a firearm.

20. The mounting assembly of claim 13, wherein the mounting portion comprises two or more parallel, coplanar, rectangular sections.

\* \* \* \* \*